United States Patent [19]
Jarvie

[11] Patent Number: 5,792,028
[45] Date of Patent: Aug. 11, 1998

[54] RUNNING EXERCISE MACHINE

[76] Inventor: John E. Jarvie, 217 S. Ash St., Springfield, Oreg. 97477

[21] Appl. No.: 911,633

[22] Filed: Aug. 15, 1997

[51] Int. Cl.$^6$ .................................................. A63B 22/00
[52] U.S. Cl. ................................................ 482/51; 482/52
[58] Field of Search ........................... 482/51, 52, 53, 482/70, 57, 96, 148, 79, 80; 434/255

[56] References Cited

U.S. PATENT DOCUMENTS

| | | |
|---|---|---|
| 219,439 | 9/1879 | Blend . |
| 567,042 | 9/1896 | Raymond . |
| 4,712,790 | 12/1987 | Szymski . |
| 4,940,233 | 7/1990 | Bull et al. . |
| 5,039,088 | 8/1991 | Shifferaw ................... 482/57 |
| 5,299,993 | 4/1994 | Habing . |
| 5,527,246 | 6/1996 | Rodgers . |
| 5,577,985 | 11/1996 | Miller . |
| 5,595,553 | 1/1997 | Rodgers . |
| 5,601,301 | 2/1997 | Liu . |
| 5,605,521 | 2/1997 | Hsieh ........................ 482/51 |

*Primary Examiner*—Stephen R. Crow
*Attorney, Agent, or Firm*—David S. Alavi

[57] ABSTRACT

An exercise machine is disclosed herein comprising: a frame; a lower crank mounted on the frame; a substantially identical upper crank mounted on the frame above the lower crank; a right moment arm pivotably connected to both upper and lower right crank arms; a left moment arm pivotably connected to both upper and lower left crank arms; and a pedal connected to the bottom end of each of the moment arms. Simultaneous rotation of the lower crank in a forward direction and the upper crank in a reverse direction generates forward orbital motion of said right pedal and forward orbital motion of said left pedal, thereby simulating the movements of a user's feet during running and/or walking. The disclosed exercise machine may also provide for arm movements appropriate for running and/or walking. This may be achieved by an exercise machine further comprising right and left upper reciprocating arms with handles that are pivotably connected to the frame above the upper crank and coupled to the upper crank by connecting rods, so that rotation of the upper crank causes reciprocating motion of the arms and handles. Alternatively, an exercise machine may further comprise handles connected to the top ends of the moment arms. The simultaneous rotation of the upper and lower cranks generates reverse orbital motion of the handles.

27 Claims, 9 Drawing Sheets

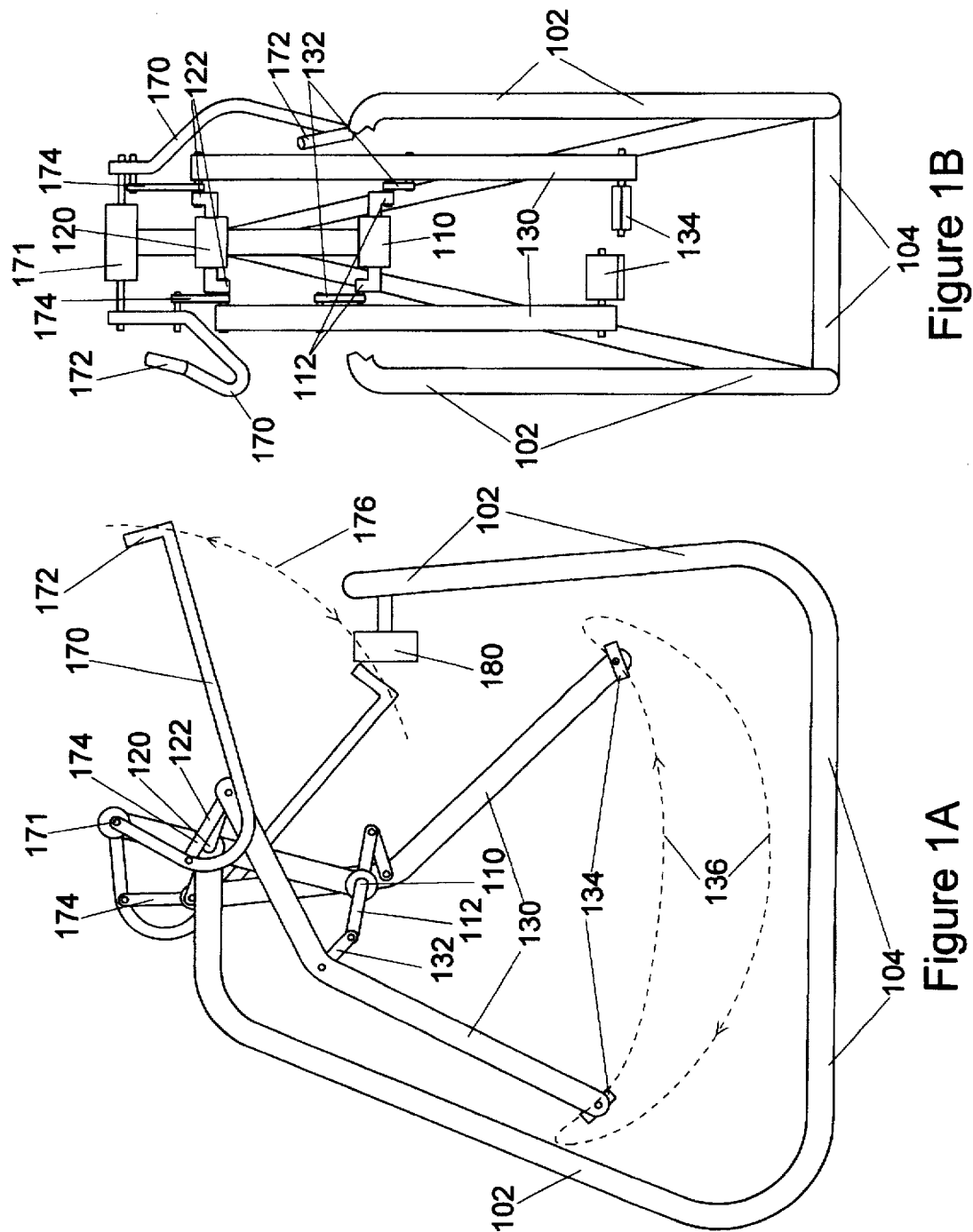

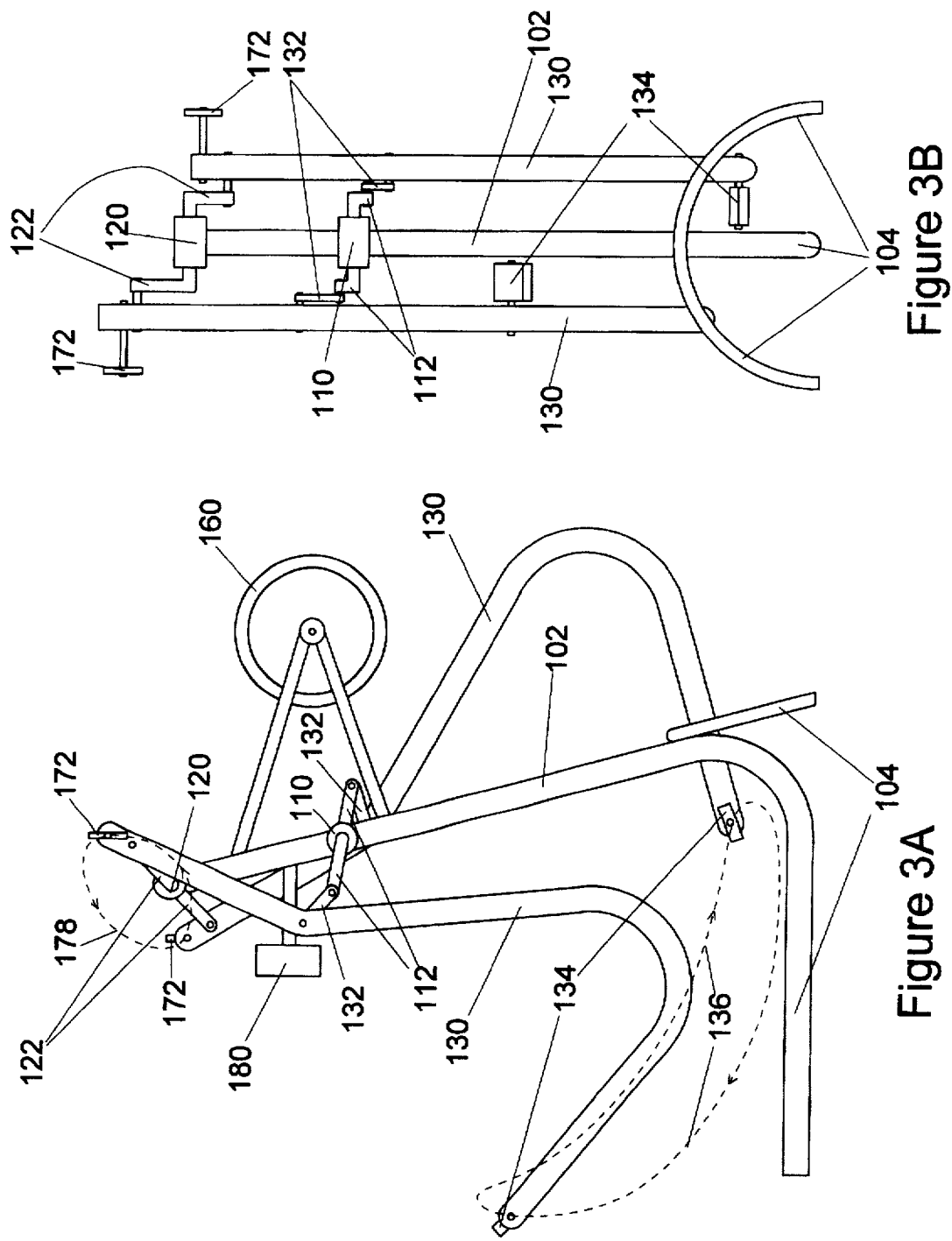

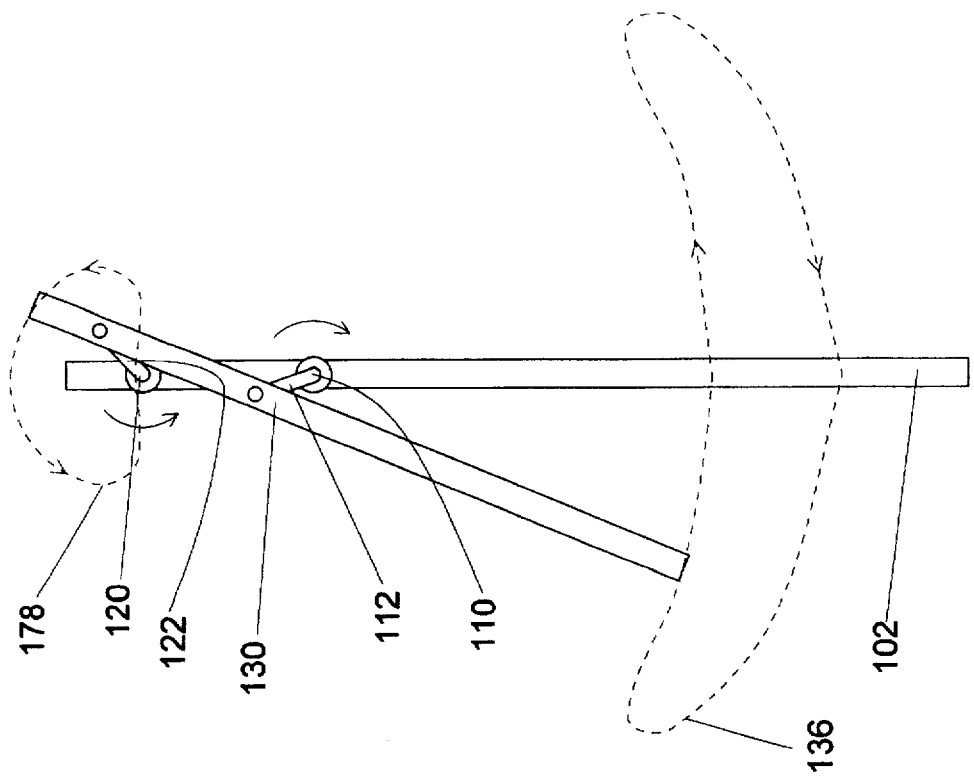
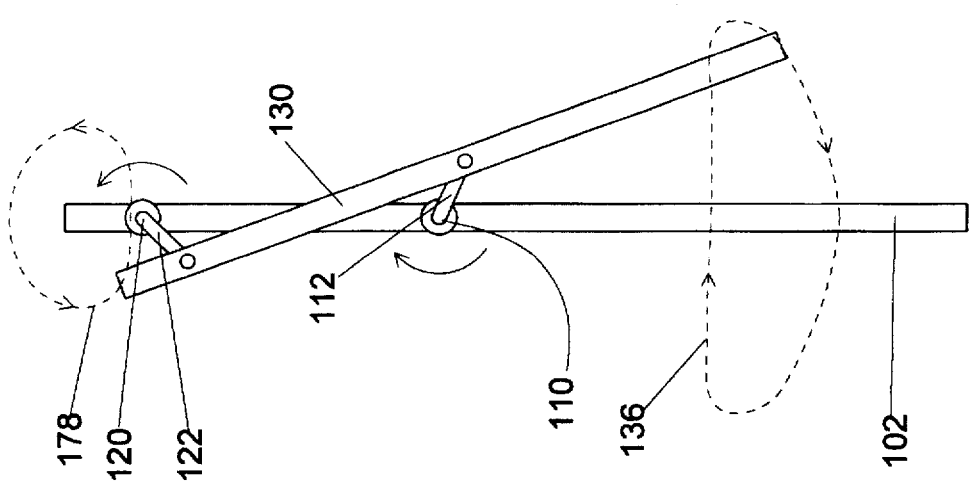
Figure 4A
Figure 4B

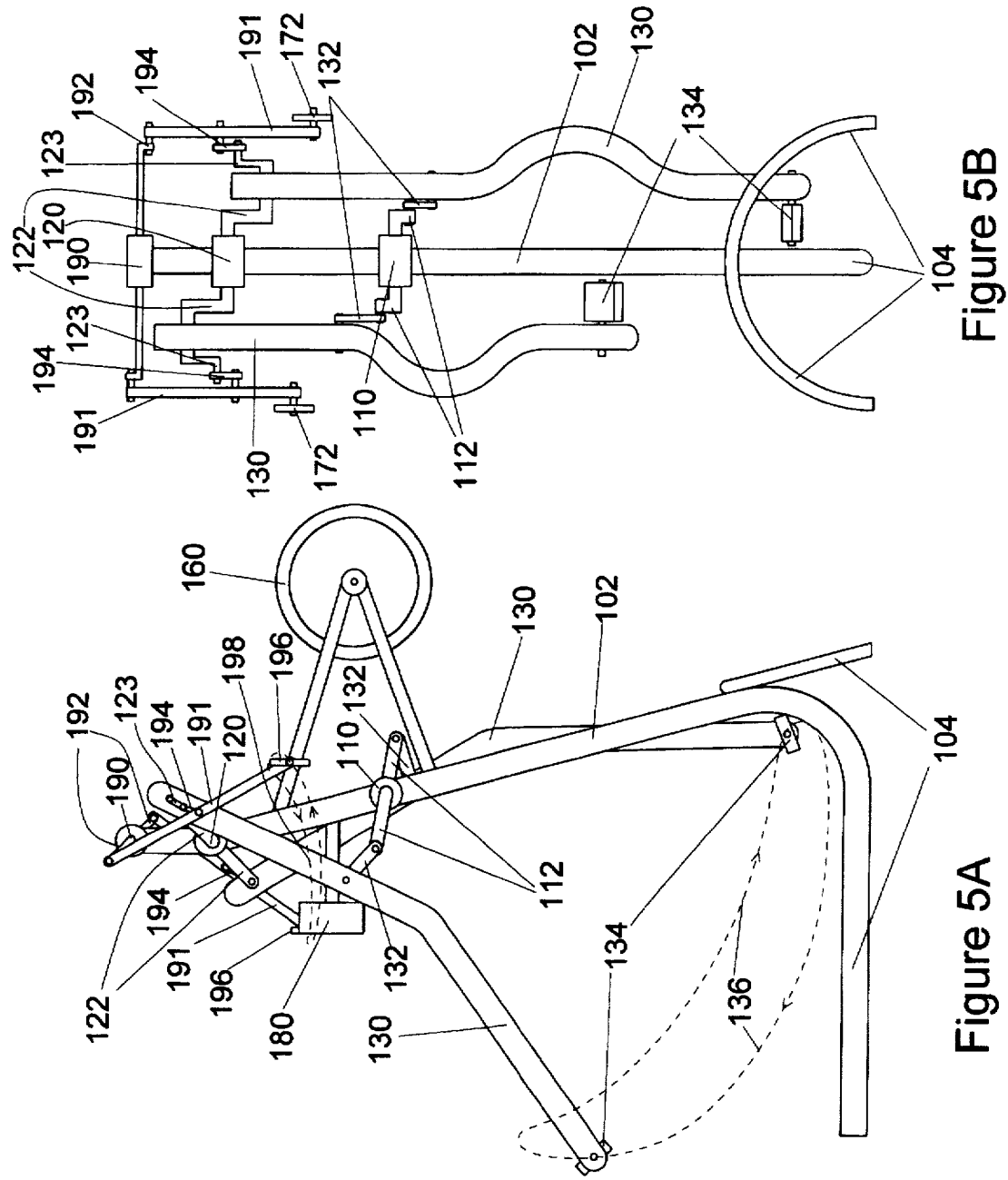

RUNNING EXERCISE MACHINE

FIELD OF THE INVENTION

The field of the present invention relates to exercise equipment. In particular, a running exerciser is described herein for simulating walking and/or running motions for exercise and/or physical training purposes.

BACKGROUND

A myriad of exercise machines are on the market today.

These machines are used to simulate a wide variety of exercise motions, and may be used for a range of physical training regimens, including, for example, resistance training and aerobic endurance training. Machines may be purchased for simulating weight lifting motions, running motions, stair-climbing motions, skiing motions, cycling motions, walking motions, and others. A particular advantage of many of these machines is the reduction of the bodily impacts associated with many exercise activities.

Cycling simulators, ski simulators, and stair simulators may be particularly noted for the elimination of impacts affecting the hips, knees, ankles, and feet. These machines generally do not reproduce what to many are the most natural exercise motions: walking and running.

Most currently available exercise machines for simulating walking and/or running are treadmill-type devices. While these machines allow walking and/or running exercise motions while remaining stationary, treadmills do not reduce or eliminate impacts inflicted on the user's lower limbs. There exists, therefore, a need for an exercise machine which simulates a natural running motion while eliminating the impacts on the user normally associated with walking and/or running. Previous devices producing low- or no-impact leg motions often produce unnatural reciprocating-type motions of the feet, and do not produce an orbital-type motions of the feet normally associated with running and/or walking. Further, treadmill devices generally do not provide for upper limb motions normally associated with walking and/or running. Typically a user will place his/her hands on a stationary bar while walking/running on the treadmill. There exists, therefore, a need for an exercise machine which simulates natural motion of the upper limbs associated with walking and/or running.

Exercise machines may also be utilized for the training of athletes in the proper form for walking and/or running. Treadmills, however, do nothing to constrain the motions of the athlete's feet and/or hands. There exists, therefore, a need for an exercise machine for simulating walking and/or running motions while constraining the motions of the user's hands and/or feet to follow predetermined and well-defined paths.

SUMMARY

Certain aspects of the present invention may overcome aforementioned drawbacks of the previous art and advance the state-of-the-art of exercise machines, and in addition may meet one or more of the following objects:

To provide an exercise machine which may simulate walking and/or running motions;

To provide an exercise machine which may eliminate bodily impacts inflicted on a user performing walking and/or running motions;

To provide an exercise machine which may produce forward orbital motions of a user's feet;

To provide an exercise machine which may produce reverse orbital motions of a user's hands;

To provide an exercise machine which may produce reciprocating motions of a user's hands;

To provide an exercise machine in which the hand and/or foot motions of a user may be precisely constrained;

To provide an exercise machine in which running and/or walking motions are produced by moment arms coupled to counter-rotating cranks;

To provide an exercise machine operable by a user in an upright position;

To provide an exercise machine operable by a user in a seated position;

To provide an exercise machine which may remain stationary while in use;

To provide an exercise machine incorporating a resistance device; and

To provide an exercise machine which may be propelled by the movements of a user.

One or more of said objects may be achieved in the present invention by an exercise machine comprising: a frame; a lower crank mounted on the frame; a substantially identical upper crank mounted on the frame above the lower crank; a right moment arm pivotably connected to both upper and lower right crank arms, so that substantial downward alignment of both upper and lower right crank arms along a line between the two crank axes may occur simultaneously; a left moment arm pivotably connected to both upper and lower left crank arms, so that substantial downward alignment of both upper and lower left crank arms along a line between the two crank axes may occur simultaneously; a right compensator pivotably connecting the right crank arm of one of the upper or lower cranks to the right moment arm; a left compensator pivotably connecting the left crank arm of one of the upper or lower cranks to the left moment arm; and a pedal connected to the bottom end of each of the moment arms. Simultaneous rotation of the lower crank in a forward direction and the upper crank in a reverse direction generates forward orbital motion of the pedals, thereby simulating the movements of a user's feet during running and/or walking. A wide variety of orbital motions for the user's feet may be generated by varying such parameters as the length of the crank arms, the distance between the crank axes, the length of the moment arms, and the shape of the moment arms. These motions do not result in bodily impacts inflicted on the user. The two cranks may be coupled so that they are constrained to rotate at substantially equal rates in opposite directions. The exercise machine may also be provided with a stationary base, wheels, a resistance device, a pad for leaning, and/or a seat.

An exercise machine according to the present invention may also provide for arm movements appropriate for running and/or walking. This may be achieved by an exercise machine further comprising right and left upper reciprocating arms with handles that are pivotably connected to the frame above the upper crank and coupled to the upper crank by connecting rods, so that rotation of the upper crank causes reciprocating motion of the arms and handles. Alternatively, an exercise machine may further comprise handles connected to the top ends of the moment arms. The simultaneous rotation of the upper and lower cranks generates reverse orbital motion of the handles.

Additional objects and advantages of the present invention may become apparent upon referring to the preferred and alternative embodiments of the present invention as illustrated in the drawings and described in the written disclosure and/or claims.

BRIEF DESCRIPTION OF THE DRAWINGS

FIG. 1a–1b show side and front views of an embodiment of an exercise machine according to the present invention.

FIGS. 3a–3b shows side and front views of an embodiment of an exercise machine according to the present invention.

FIGS. 4a–4d illustrate examples of orbital motions generated lo by moment arms in various embodiments of an exercise machine according to the present invention.

FIGS. 5a–5b show front and side views of an embodiment of an exercise machine according to the present invention.

DETAILED DESCRIPTION OF PREFERRED AND ALTERNATIVE EMBODIMENTS

Figure 2B:
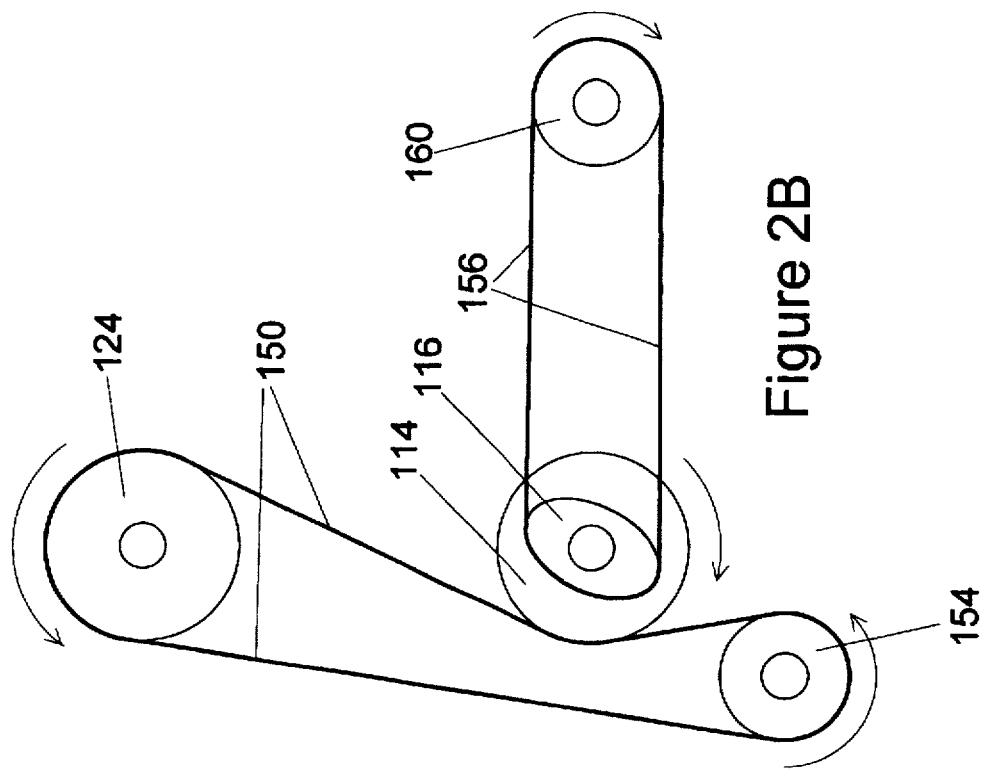
FIG. 2b shows details of the coupling of upper and lower cranks and resistance device by chains in an embodiment of an exercise machine according to the present invention.

For purposes of this specification, including the claims, the term "forward rotation" and its equivalents shall denote clockwise rotation when viewed from the right side of the exercise machine. Similarly, the term "reverse rotation" and its equivalents shall denote counter-clockwise rotation when viewed from the right side of the exercise machine. The term "forward orbital motion" and its equivalents shall denote clockwise motion along a path comprising a simple closed curve as viewed from the right side of the exercise machine. The term "reverse orbital motion" and its equivalents shall denote counter-clockwise motion along a path comprising a simple closed curve as viewed from the right side of the exercise machine. The right side of the exercise machine is the side on a user's right side when facing forward in a position suitable for use of the exercise machine.

FIGS. 1a–1b shows front and side views of a preferred embodiment of an exercise machine according to the present invention. Frame 102 may rest on the ground on base portion 104. Lower crank 110 and upper crank 120 are shown mounted on frame 102 with their respective axes oriented horizontally, transversely, and parallel to each other. The parallel axes of the upper and lower cranks define a rotation axis reference plane (not shown). Each crank is a standard bicycle-type crank, comprising an axle portion about which the crank rotates, and right and left crank arms extending radially from the rotation axis of the crank 180° from each other. The upper and lower cranks preferably have substantially the same dimensions.

In the subsequent description, structures appearing on both sides of the exercise machine will only be described for the right side of the exercise machine. It should be understood that such structures described for the right side of the exercise machine have counterparts on the left side. Right moment arm 130 is pivotably connected to right crank arms 112 and 122 of each of the upper and lower cranks 110 and 120, respectively. The connection between lower crank arm 112 and moment arm 130 is made via compensator 132 pivotably connected at one end to crank arm 112 and at the other end to moment arm 130. The pivotable connections between crank arms 112 and 122, compensator 132, and moment arm 130 are such that upper and lower crank arms 112 and 122 may simultaneously be substantially downwardly aligned in the rotation axis reference plane. Such pivotable connections also allow the upper and lower crank arms 112 and 122 to be simultaneously substantially upwardly aligned in the rotation axis reference plane. The lower end of moment arm 130 may be provided with a pedal 134 on which a user may place his/her foot in order to use the exercise machine. Simultaneous forward rotation of lower crank 110 and reverse rotation of upper crank 120 results in forward orbital motion of pedal 134 along elongated orbital path 136, simulating the motion of the user's foot while running.

Figure 2A:
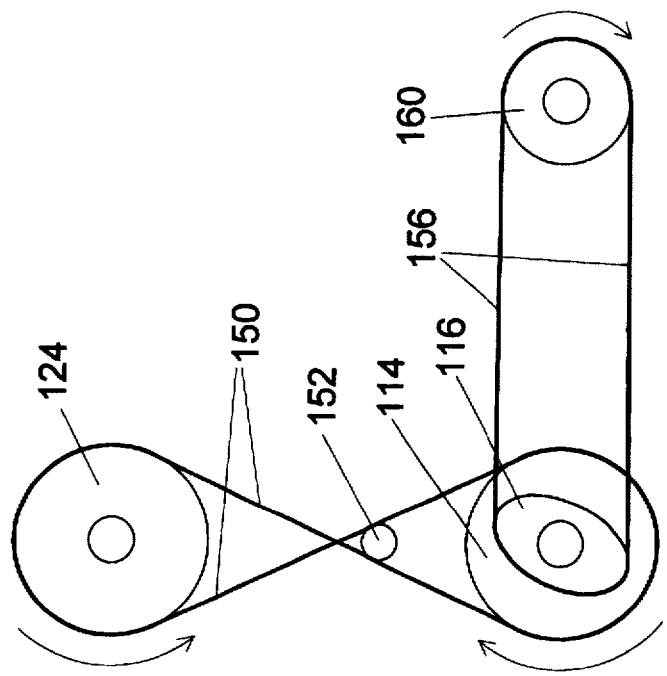

The simultaneous rotation of cranks 110 and 120 may be coupled. FIGS. 2a–2b shows means for constraining the rotation of cranks 110 and 120 so that they rotate at substantially the same rate and in opposite directions. FIGS. 2a–2b shows two different coupling mechanisms based on a timing chain and chain rings. Lower crank 110 may be provided with chain ring 114 and upper crank 120 may be provided with chain ring 124. Chain rings 114 and 124 preferably have substantially the same dimensions. Chain 150 may be engaged about chain rings 114 and 124 in a "figure-eight" configuration as shown in FIG. 2A, thereby constraining chain rings 114 and 124 (and cranks 110 and 120) to rotate in opposite directions at substantially the same rate. Chain separator 152 may be employed to prevent the crossed portions of chain 150 from interfering with each other. Alternatively, idler chain ring 154 may be employed, and chain 150 engaged with chain rings 114, 124, and 154 as shown in FIG. 2B. This arrangement also constrains chain rings 114 and 124 (and cranks 110 and 120) to rotate in opposite directions at substantially the same rate, but avoids the chain crossing shown in FIG. 2A.

As shown in FIGS. 2a–2b lower crank 110 may be provided with resistance chain ring 116, and chain 156 may be employed to couple chain ring 116 to a resistance device 160. Chain ring 116 may be substantially circular, or may be elliptical in order to vary the required resistance over the course of a rotation. An elliptical resistance chain ring should be oriented so that the largest gear ratio is brought to bear at the most forward point of the pedal orbit. It is at this point that the force applied to the exercise machine is the greatest. If a round gear is used the user experiences a sudden drop as the pedal drops down and around the forward end of the pedal orbit. A larger gear ratio at this point smoothes out the motion for the user. The chains, chain rings, and resistance device may be incorporated into the embodiment of FIG. 1, but were omitted from FIG. 1 for clarity.

Referring again to FIGS. 1A–1B, right upper reciprocating arm 170 is shown pivotably connected at one end to frame 102 at fixed pivot point 171, and having handle 172 at the other end. Right connecting rod 174 is pivotably connected at one end to the right crank arm 122 of upper crank 120, and pivotably connected at the other end to reciprocating arm 170. As upper crank 120 rotates, arm 170 and handle 172 undergo reciprocating motion along arc-shaped path 176, simulating motion of a user's hand while running.

To use the exercise machine of FIGS. 1A–1B, a user must straddle the exercise machine with cranks 110 and 120 behind him/her. The user's feet are then placed on the pedals 134, and the hands placed on handles 172. Frame 102 is provided with pad 180, against which the user may lean forward while using the exercise machine in a substantially upright position. Pad 180 and a portion of frame 102 have been omitted from the front view of FIG. 1B for clarity. As shown in FIG. 1A, the bottom portion of moment arm 130 is bent forward at a point below the pivotable attachment of compensator 132. This allows positioning of orbital path 136 of pedal 134 at a location appropriate to simulate a natural running motion. Likewise, reciprocating arm 170 is shown curved and elongated in order to place path 176 at a location appropriate to simulate a natural running motion. A wide range of motions may be generated by adjusting the lengths of the crank arms, the distance between the crank axes, the lengths and shapes of the moment arms, and the lengths and shapes of the reciprocating arms. In this way users of various statures may be accommodated, and/or specific hand and foot motions may be imposed upon the user for training purposes. Curved and/or bent shapes of moment arm 130 and/or reciprocating arm 170 may also serve to reduce interference with the user's arm and/or legs while using the exercise machine. Frame 102 may be configured in a variety of ways with this same objective in mind. The user may proceed to move with a running or walking motion to use the exercise machine. Resistance may be provided by a resistance device as depicted in FIGS. 2A–2B (not shown in FIG. 1).

An alternative embodiment of the present invention is shown in FIGS. 3A–3B. Chains and chain rings have been omitted from FIGS. 3A–3B for clarity. Likewise, pad 180 and resistance device 160 have been omitted from the front view of FIGS. 3A–3B. In this embodiment the cranks 110 and 120 are positioned in front of the user. The lower ends of moment arms 130 are accordingly bent toward the rear of the exercise machine to properly position orbital path 136 with respect to the position of the user, who leans forward against pad 180. Reciprocating arms 170 are not present in this embodiment. Instead, handles 172 are pivotably connected to the upper ends of moment arms 130. As the user runs on the exercise machine, his/her hands move in a reverse direction about orbital path 178.

Figure 4D:
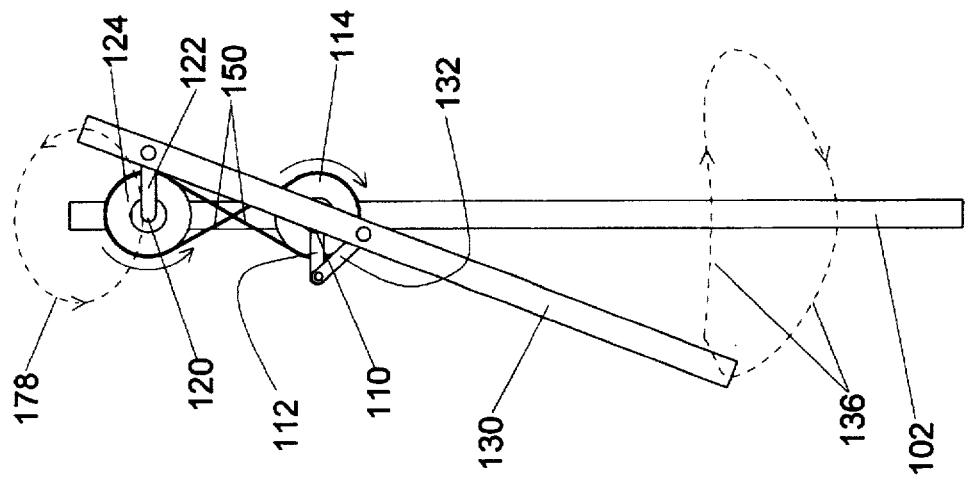
Figure 4C:
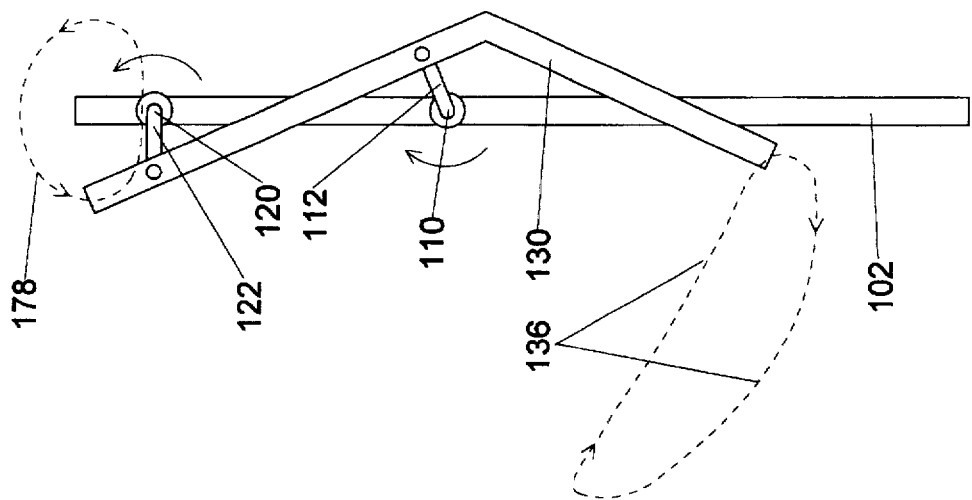

FIGS. 4A–4D illustrates the variety of orbital paths 136 and 178 that may be produced by the rotation of cranks 110 and 120 and attached moment arm 130. FIG. 4A shows a simple straight moment arm 130 attached to cranks 110 and 120. Each of paths 136 and 178 are elongated in the horizontal direction. The vertical extent of orbital paths 136 and 178 is equal to twice the length of crank arms 112 and 122. The horizontal extents of orbital paths 136 and 178 depend on the distance between cranks 110 and 120, the length of crank arms 112 and 122, and the distances from the points of attachment of crank arms 112 and 122 to the lower and upper ends, respectively, of moment arm 130. Many combinations of lengths can be used, which allow great flexibility in designing an optimal exercise motion for a user. The distances may be made adjustable in order to allow accommodation of users of a variety of statures and having differing exercise goals. Specific hand and/or foot motions may be imposed upon the user for training purposes. For example, FIG. 4B shows orbital path 136 becoming more elongated as the cranks are moved closer together relative to FIG. 4A. FIG. 4C shows the displacement of orbital path 136 as the ends of moment arm 130 are curved and/or bent. This allows further flexibility in producing optimal exercise motions and/or running simulation. It should be noted that while a wide range of motions may be produced, it may not be possible to produce an arbitrary orbital path for the user's hands and/or feet.

FIG. 4D illustrates the effect of coupling the rotation of the cranks and the need for compensators 132. Without compensators 132, it is not possible for cranks 110 and 120 to rotate in opposite directions with moment arms attached to both sides of the cranks. Likewise, it is not possible for cranks 110 and 120 to rotate in opposite directions at the same rate without compensators 132, even with only one moment arm attached. Without compensators 132, the cranks would rotate at the same average rate, but the rate would vary somewhat during the course of each rotation and the variation depends on whether the moment arm is connected to the right crank arms or the left crank arms, thereby making it impossible for cranks 110 and 120 to rotate in opposite directions without compensators 132 when moment arms 130 are connected to crank arms on both sides, or when cranks 110 and 120 are constrained to rotate in opposite directions at the same rate. Compensators are shown pivotably connecting the lower crank arms to the moment arms. Alternatively, compensators may equivalently be used to pivotably connect the upper crank arms to the moment arms.

FIG. 5A–5B illustrate an alternative embodiment of the present invention in which another crank and handle moment arms have been added. Chains and chain rings have been omitted from FIGS. 5A–5B for clarity. Likewise, pad 180 and resistance device 160 have been omitted from the front view of FIG. 5B. The handle moment arms 191 provide greater flexibility in tailoring the hand motion of the user. Top crank 190 is positioned above upper crank 120, which has been modified to include an additional pivot point 123 on crank arm 122. In a manner completely analogous to the pivotable attachment of moment arm 130 to cranks 110 (through compensators 132) and 120 (directly), handle moment arm 191 is pivotably connected at the upper end to crank arm 192, pivotably connected via compensator 194 to pivot point 123 of crank arm 122, and provided at the lower end with handle 196. Crank 190 rotates in a forward direction during operation of the exercise machine, and may be coupled to crank 120 thereby constraining crank 190 to rotate in the opposite direction from and at substantially the same rate as crank 120. By varying the distance between crank 120 and crank 190, the length of crank arm 192, and the length of handle moment arm 191, a wide variety of handle orbital motions may be produced, in a manner completely analogous to that described hereinabove.

Figures 6A, 6B:
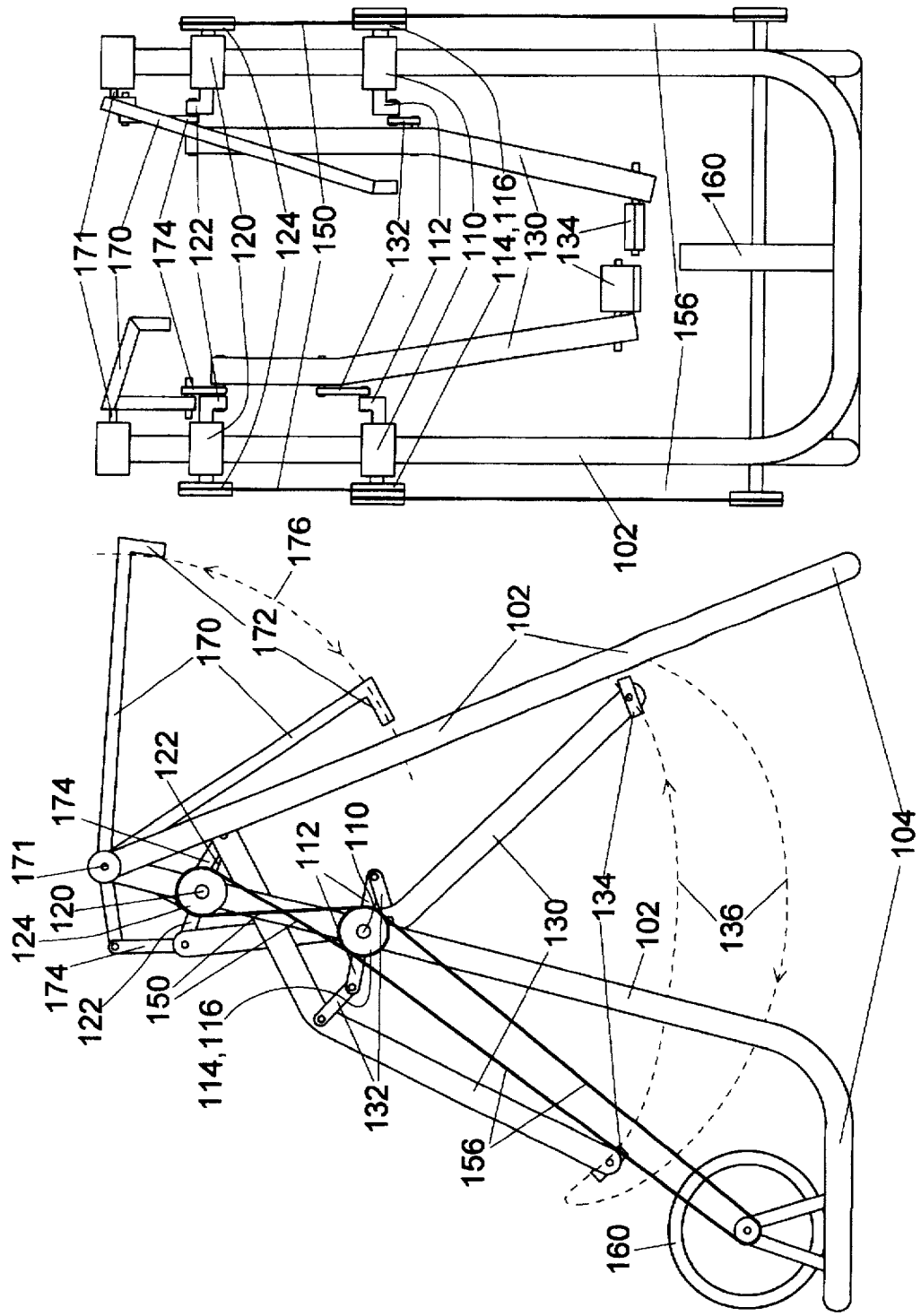
FIGS. 6a–6b show front and side views of an embodiment of an exercise machine according to the present invention.

FIGS. 6A–6B show an alternative embodiment of the present invention in which is functionally nearly equivalent to the embodiment of FIGS. 1A–1B. Pedals 134 follow orbital path 136 while handles 172 undergo reciprocating motion along arc 176. However, in the embodiment of FIGS. 6A–6B, the right and left sides of cranks 110 and 120 have been separated, allowing the user occupy positions between the right and left sides of cranks 110 and 120. Unlike the embodiments of FIGS. 1, 3, and 5, the user may be arbitrarily positioned relative to the crank axes. By removing the cranks, chain rings, and chains from a mid-line position and moving them to the sides of the apparatus, greater flexibility of user position, foot motion, and hand motion are attainable. It is necessary to maintain synchronization of the two halves of the exercise machine, as though cranks 110 and 120 were indeed single units. This is achieved in the embodiment of FIGS. 6A–6B by coupling both sides to a common resistance device, but may be achieved by any suitable timing mechanism.

Figure 7A:
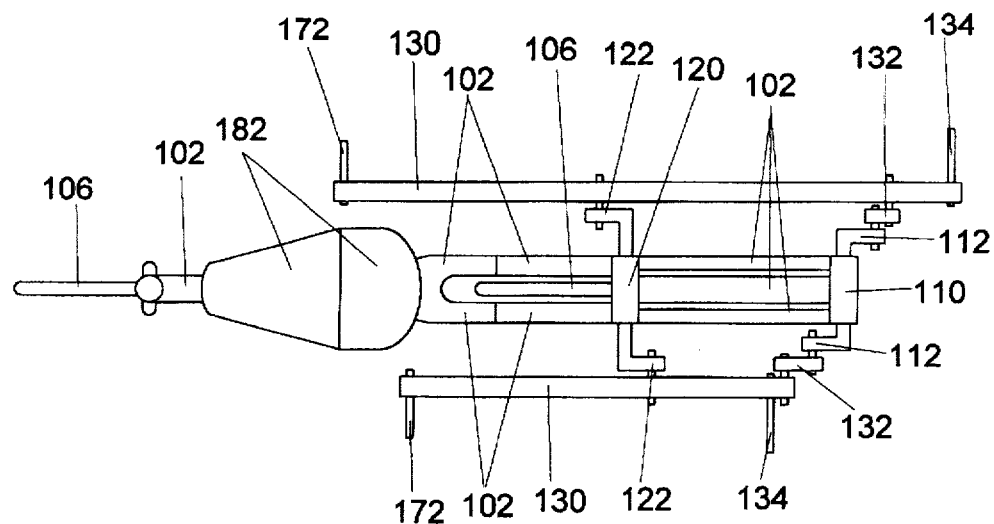
FIGS. 7a–7b shows top and side views of an embodiment of an exercise machine according to the present invention.
Figure 7B:
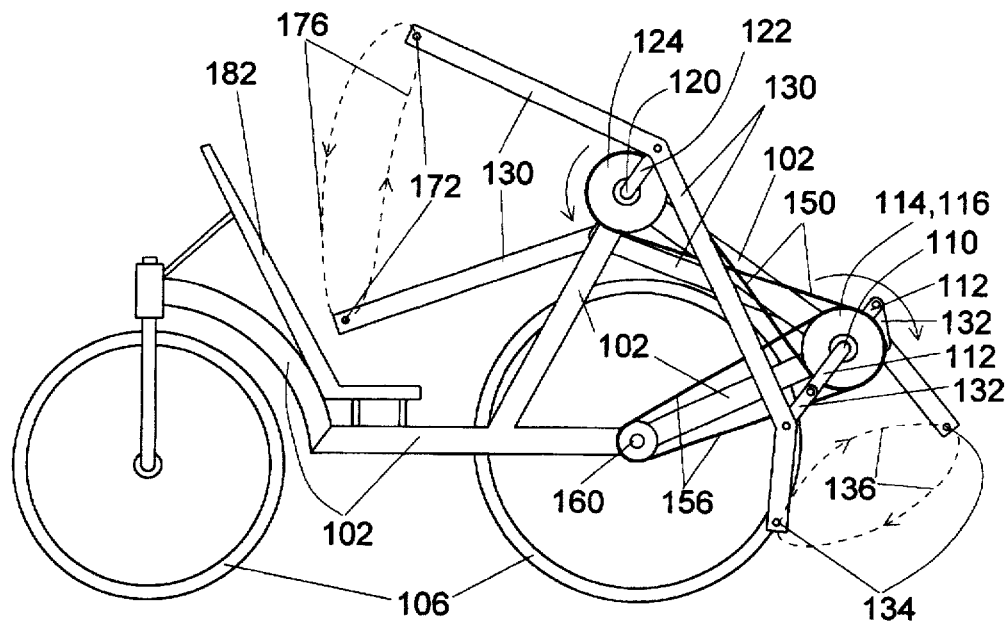

FIGS. 7A–7B show an alternative embodiment of the present invention in which seat 182 is provided instead of pad 180. Chains and chain rings have been omitted from the top view for clarity. Cranks 110 and 120 are positioned, and moments arms 130 are curved, so that while seated in seat 182 a user may place his/her feet on pedals 134 and grasp handles 172 and comfortably drive the exercise machine.

Instead of base 104, wheels 106 are provided, thereby allowing the exercise machine to roll freely. Crank 110 is coupled to at least one of wheels 106, which thereby serves as a drive wheel and resistance device 160. By operating the exercise machine a user may propel him/herself and the exercise machine in a manner quite similar to a recumbent bicycle. Without departing from inventive concepts disclosed and/or claimed herein, seat 182 may be incorporated into a stationary exercise machine. Similarly, pad 180 may be incorporated into a moving, bicycle-like exercise machine, to be operated by a user using an upright running-like motion.

Figure 8:
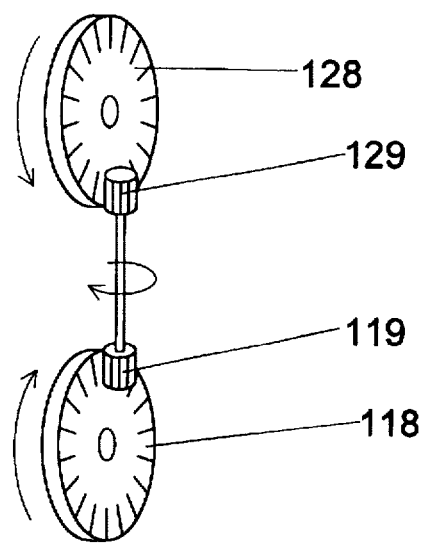
FIG. 8 shows details of the coupling of upper and lower cranks by gears in an embodiment of an exercise machine according to the present invention.

Without departing from inventive concepts disclosed and/or claimed herein, in a alternative embodiment of the present invention, any means may be employed to constrain cranks 110 and 120 to rotate in opposite directions at substantially the same rate. For example, FIG. 8 illustrates a gear system which may be employed to couple cranks 110 and 120. Lower crank 110 may be provided with crown gear 118, and upper crank 120 may be provided with crown gear 128. Lower pinion gear 119 and upper pinion gear 129 may be mounted on a common shaft, with lower pinion gear 119 engaging crown gear 118 and upper pinion gear 129 engaging crown gear 128, thereby constraining cranks 110 and 120 to rotate in opposite directions at substantially the same rate. Suitable coupling/constraining means may include but is not limited to: chain rings and chains, gears, pulleys and cables, drive shafts, sprockets, functional equivalents thereof, and/or combinations thereof. Without departing from inventive concepts disclosed and/or claimed herein, the means for coupling crank 110 and/or crank 120 to a resistance device may include but is not limited to: chain rings and chains, gears, pulleys and cables, drive shafts, sprockets, functional equivalents thereof, and/or combinations thereof. Without departing from inventive concepts disclosed and/or claimed herein, the resistance device may include but is not limited to: a friction device, a drive wheel, a flywheel, weights, springs, elastic devices, hydraulic devices, pneumatic devices, aerodynamic devices, electromagnetic devices, functional equivalents thereof, and/or combinations thereof.

The present invention has been set forth in the form of its preferred embodiments. It is nevertheless intended that modifications to the disclosed exercise machines may be made without departing from inventive concepts disclosed and/or claimed herein.

What is claimed is:

1. An exercise machine, comprising:

a frame having a front, a back, a right side, a left side, and a bottom;

a lower crank, comprising a crank axle, a left crank arm, and a right crank arm, said lower crank being mounted on said frame and rotatable about a lower horizontal transverse rotation axis;

an upper crank, comprising a crank axle, a left crank arm, and a right crank arm, said upper crank being mounted on said frame above said lower crank and rotatable about an upper horizontal transverse rotation axis, said upper axis being higher than and substantially parallel to said lower axis, said upper axis and said lower axis forming a rotation axis reference plane, said upper crank having substantially the same dimensions as said lower crank;

a right moment arm having a top end and a bottom end, said right moment arm being pivotably connected to each of the right crank arm of said lower crank and the right crank arm of said upper crank, so that substantial downward alignment of the right crank arm of said lower crank in the reference plane and substantial downward alignment of the right crank arm of said upper crank in the reference plane may occur simultaneously;

a left moment arm having a top end and a bottom end, said left moment arm being pivotably connected to each of the left crank arm of said lower crank and the left crank arm of said upper crank, so that substantial downward alignment of the left crank arm of said lower crank in the reference plane and substantial downward alignment of the left crank arm of said upper crank in the reference plane may occur simultaneously;

a right compensator, said right compensator being pivotably connected to the right crank arm of one of said lower crank and said upper crank and pivotably connected to said right moment arm, thereby pivotably connecting the right crank arm of one of said lower crank and said upper crank to said right moment arm;

a left compensator, said left compensator being pivotably connected to the left crank arm of one of said lower crank and said upper crank and pivotably connected to said left moment arm, thereby pivotably connecting the left crank arm of one of said lower crank and said upper crank to said left moment arm; and a right pedal connected to the bottom end of said right moment arm and a left pedal connected to the bottom end of said left moment arm, wherein simultaneous rotation of said lower crank in a forward direction and said upper crank in a reverse direction generates forward orbital motion of said right pedal and forward orbital motion of said left pedal.

2. An exercise machine as recited in claim 1, further comprising:

a right upper reciprocating arm having a first end and a second end, the first end being pivotably connected to said frame above said upper crank and the second end having a handle;

a left upper reciprocating arm having a first end and a second end, the first end being pivotably connected to said frame above said upper crank and the second end having a handle;

a right connecting rod having a first end and a second end and being pivotably connected at the first end to said right crank arm of said upper crank and being pivotably connected at the second end to said right upper reciprocating arm between the first and second ends of said reciprocating arm, whereby rotation of said upper crank causes reciprocating motion of said right upper reciprocating arm; and a left connecting rod having a first end and a second end and being pivotably connected at the first end to said left crank arm of said upper crank and being pivotably connected at the second end to said left upper reciprocating arm between the first and second ends of said reciprocating arm, whereby rotation of said upper crank causes reciprocating motion of said left upper reciprocating arm.

3. An exercise machine as recited in claim 2, further comprising means for coupling the rotation of said upper crank and said lower crank, whereby said upper crank and said lower crank are constrained to rotate at substantially the same rate and in opposite directions.

4. An exercise machine as recited in claim 3, wherein:

said lower crank further comprises a substantially circular chain ring mounted on the crank axle;

said upper crank further comprises a substantially circular chain ring mounted on the crank axle, said chain ring having substantially the same dimensions as the chain ring of said lower crank; and said coupling means comprises a chain, said chain engaging the chain ring of said upper crank and the chain ring of said lower crank and being arranged in a crossed "figure-eight" configuration, thereby constraining said upper crank and said lower crank to rotate at substantially the same rate and in opposite directions.

5. An exercise machine as recited in claim 3, wherein said coupling means comprises:

a crown gear wheel mounted on the crank axle of said lower crank;

a crown gear wheel mounted on the crank axle of said upper crank; and a coupling gear assembly comprising a lower pinion gear engaging the crown gear wheel of said lower crank, an upper pinion gear engaging the crown gear wheel of said upper crank, and a shaft connecting the upper pinion gear and the power pinion gear.

6. An exercise machine as recited in claim 2, wherein at least one of said lower crank and said upper crank is coupled to a resistance device.

7. An exercise machine as recited in claim 6, wherein said lower crank further comprises a resistance chain ring, and said resistance device is coupled to said lower crank by a chain engaged with the resistance chain ring of said lower crank.

8. An exercise machine as recited in claim 7, wherein said resistance chain ring is elliptical.

9. An exercise machine as recited in claim 6, wherein said resistance devise comprises at least one friction wheel.

10. An exercise machine as recited in claim 6, wherein:

said frame is provided with at least two wheels, thereby allowing said exercise machine to roll;

said resistance device comprises at least one of said at least two wheels; and forward rotation of said lower crank causes said exercise machine to roll forward.

11. An exercise machine as recited in claim 2, further comprising a pad mounted on said frame so that a user of said exercise machine may lean forward against said pad when standing with a foot on each of said right and left pedals and facing toward the front of the frame.

12. An exercise machine as recited in claim 2, further comprising a seat mounted on said frame so that a user of said exercise machine may sit on said seat with a foot on each of said right and left pedals and facing toward the front of said frame.

13. An exercise machine as recited in claim 2, further comprising a base for supporting said frame in a stationary position.

14. An exercise machine as recited in claim 2, further comprising:

a base for supporting said frame in a stationary position;

a substantially circular chain ring mounted on the crank axle of said lower crank;

a substantially circular chain ring mounted on the crank axle of said upper crank, said chain ring having substantially the same dimensions as the chain ring of said lower crank;

means for coupling the rotation of said upper crank and said lower crank, said coupling means comprising a chain, said chain engaging the chain ring of said upper crank and the chain ring of said lower crank and being arranged in a crossed "figure-eight" configuration, thereby constraining said upper crank and said lower crank to rotate at substantially the same rate and in opposite directions;

a resistance device;

an elliptical resistance chain ring mounted on the crank axle of said lower crank, said lower crank being coupled to said resistance device by a chain engaged with the resistance chain ring of said lower crank; and a pad mounted on said frame so that a user of said exercise machine may lean forward against said pad when standing with a foot on each of said right and left pedals and facing toward the front of the frame.

15. An exercise machine as recited in claim 1, further comprising a right handle connected to the top end of said right moment arm and a left handle connected to the top end of said left moment arm, wherein said simultaneous rotation of said lower crank and said upper crank generates reverse orbital motion of said right handle and reverse orbital motion of said left handle.

16. An exercise machine as recited in claim 15, further comprising means for coupling the rotation of said upper crank and said lower crank, whereby said upper crank and said lower crank are constrained to rotate at substantially the same rate and in opposite directions.

17. An exercise machine as recited in claim 16, wherein:

said lower crank further comprises a substantially circular chain ring mounted on the crank axle;

said upper crank further comprises a substantially circular chain ring mounted on the crank axle, said chain ring having substantially the same dimensions as the chain ring of said lower crank; and said coupling means comprises a chain, said chain engaging the chain ring of said upper crank and the chain ring of said lower crank and being arranged in a crossed "figure-eight" configuration, thereby constraining said upper crank and said lower crank to rotate at substantially the same rate and in opposite directions.

18. An exercise machine as recited in claim 16, wherein said coupling means comprises:

a crown gear wheel mounted on the crank axle of said lower crank;

a crown gear wheel mounted on the crank axle of said upper crank; and a coupling gear assembly comprising a lower pinion gear engaging the crown gear wheel of said lower crank, an upper pinion gear engaging the crown gear wheel of said upper crank, and a shaft connecting the upper pinion gear and the power pinion gear.

19. An exercise machine as recited in claim 15, wherein at least one of said lower crank and said upper crank is coupled to a resistance device.

20. An exercise machine as recited in claim 19, wherein said lower crank further comprises a resistance chain ring, and said resistance device is coupled to said lower crank by a chain engaged with the resistance chain ring of said lower crank.

21. An exercise machine as recited in claim 20, wherein said resistance chain ring is elliptical.

22. An exercise machine as recited in claim 19, wherein said resistance devise comprises at least one friction wheel.

23. An exercise machine as recited in claim 19, wherein:

said frame is provided with at least two wheels, thereby allowing said exercise machine to roll;

said resistance device comprises at least one of said at least two wheels; and forward rotation of said lower crank causes said exercise machine to roll forward.

24. An exercise machine as recited in claim 15, further comprising a pad mounted on said frame so that a user of said exercise machine may lean forward against said pad when standing with a foot on each of said right and left pedals and facing toward the front of the frame.

25. An exercise machine as recited in claim 15, further comprising a seat mounted on said frame so that a user of said exercise machine may sit on said seat with a foot on each of said right and left pedals and facing toward the front of said frame.

26. An exercise machine as recited in claim 15, further comprising a base for supporting said frame in a stationary position.

27. An exercise machine as recited in claim 15, further comprising:

a base for supporting said frame in a stationary position;

a substantially circular chain ring mounted on the crank axle of said lower crank;

a substantially circular chain ring mounted on the crank axle of said upper crank, said chain ring having substantially the same dimensions as the chain ring of said lower crank;

means for coupling the rotation of said upper crank and said lower crank, said coupling means comprising a chain, said chain engaging the chain ring of said upper crank and the chain ring of said lower crank and being arranged in a crossed "figure-eight" configuration, thereby constraining said upper crank and said lower crank to rotate at substantially the same rate and in opposite directions;

a resistance device;

an elliptical resistance chain ring mounted on the crank axle of said lower crank, said lower crank being coupled to said resistance device by a chain engaged with the resistance chain ring of said lower crank; and a pad mounted on said frame so that a user of said exercise machine may lean forward against said pad when standing with a foot on each of said right and left pedals and facing toward the front of the frame.

\* \* \* \* \*